United States Patent [19]

Wright

[11] 3,885,984

[45] May 27, 1975

[54] METHYL ALKYL SILICONE THERMOCONDUCTING COMPOSITIONS

[75] Inventor: John H. Wright, Elnora, N.Y.

[73] Assignee: General Electric Company, Waterford, N.Y.

[22] Filed: Dec. 18, 1973

[21] Appl. No.: 425,815

[52] U.S. Cl. .............................. 106/287 SB; 252/74
[51] Int. Cl. ................................................ C09k 3/02
[58] Field of Search ........... 106/287 SB; 252/70, 73; 253/74

[56] References Cited
UNITED STATES PATENTS 2,900,338   8/1959   Postelnek ..................... 106/287 SB

*Primary Examiner*—Lewis T. Jacobs
*Attorney, Agent, or Firm*—Donald J. Voss; George B. Finnegan, Jr.; Rocco S. Barrese

[57] ABSTRACT

High performance heat transfer compositions comprising (i) a methyl alkyl polysiloxane and (ii) a thickener selected from oxides of beryllium, aluminum, silicon and zinc. The alkyl group carbon content ranges from $C_4$ to $C_{16}$ and the thermoconductance values are substantially higher than those obtained with prior art silicone compositions. The thermoconductors are also unique in that they do not resist painting and soldering.

13 Claims, No Drawings

METHYL ALKYL SILICONE THERMOCONDUCTING COMPOSITIONS

The present invention is concerned with novel electronic heat-sink compositions based on silicones. More particularly, the present invention relates to compositions of methyl alkyl polysiloxane fluids thickened with substantial amounts of the oxides of beryllium, aluminum, silicon or zinc.

BACKGROUND OF THE INVENTION

Electronic heat-sink compositions find major applications in TV sets, diodes, and other electronic devices (power transistor) where the excess heat generated in operation is to be drawn off to non-conducting heat-sinks such as the chassis or the frame of the apparatus or devices. The use of dimethylsilicone fluids in thermoconducting compositions thickened with oxide thickeners, such as those of beryllium, aluminum or zinc, is well known. All such thermoconductors are made by mixing and/or milling the oxide into the fluid to such a loading that a grease like semi-solid composition is formed. As in the analogous greasemaking art, it is important to obtain a composition with the proper consistency, and to assure this, it has been convenient to measure the penetration by a standard method, such as American Society for Testing Materials (ASTM) Test Method 217D. The penetration of the thermoconductor by this method will most desirably have a value of not less than 200, and preferably of 250, after 60X working. Typically, following the prior art, a 350 centistoke viscosity dimethyl polysiloxane fluid will hold about 77% by weight of oxide thickener based on thickener and fluid, as a maximum, if the composition with an acceptable penetration of 250 is to be obtained. A much more viscous dimethyl polysiloxane fluid, e.g., of 30,000 centistokes viscosity, will only hold one of about 67% by weight of metal oxide while still maintaining a penetration of 250. Obviously, thermal conductivity will be reduced. Within such narrow limits of possible formulation, the thermoconductance values of even the best prior art compositions tend to reach a maximum of only about 0.350 BTU/hr./ft.$^2$/°F./ft., when measured by the hot wire method. In this test, a fine wire is dipped in the composition in series with a voltmeter and ammeter. A potential is applied and the current and voltage are measured and resistance is obtained by calculator, and converted to the stated units by known methods. This maximum limit on thermoconductivity is somewhat lower than would be desirable, because it limits the amount of heat that can be removed from modern day electronic components, and this makes size and weight reduction a problem. In addition, the compositions based on dimethyl polysiloxanes are very difficult to paint or solder and unusual cleaning procedures must be employed to make the surface amenable to assembly and to decoration and protection with paint.

It has now been discovered that when used to make thermoconducting compositions methyl alkyl polysiloxanes behave in a different and unusual manner in comparison with dimethyl polysiloxanes. For example, if the chain length of the alkyl group is increased, the amount of oxide that can be loaded into the composition, while maintaining the desired consistency, e.g., penetration, increases until the chain length reaches eight to 10 carbon atoms. Above this point, there is only a slight decrease as the number of carbons in the alkyl group increases up to about 16 carbon atoms. Above 16 carbon atoms in the chain, the amount of oxide which can be loaded falls below that which can be loaded even in dimethyl polysiloxanes. Below four carbon atoms, e.g., with two carbon atoms, likewise, the loading will decrease, as will the thermoconductivity.

Based on this discovery, there is an important two-way increase in thermoconductivity available if such methyl alkyl polysiloxanes are substituted for dimethyl polysiloxanes:

1. there is an increase because the methyl alkyl fluids themselves have higher thermoconductivity than do the dimethyl fluids; and
2. because the oxide loading can be substantially increased, the resulting compositions have greatly improved thermoconductivity.

The present discovery provides compositions with thermoconductance values which are 20–30% higher than those heretofore attainable. This permits them to be used in smaller amounts, more economically. Moreover, all of the new compositions are also unique in that parts which include them are paintable and solderable after normal cleaning procedures, a feature not present with the silicone based electronic heat-sink compounds now available.

DESCRIPTION OF THE INVENTION

According to the present invention, there are provided compositions having high thermoconductance comprising:

i. a methyl alkyl polysiloxane having the formula

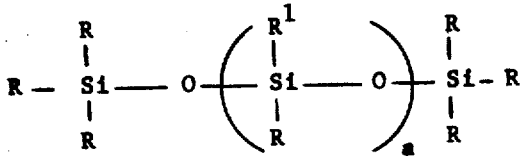

wherein R is methyl and $R^1$ is a monovalent hydrocarbon radical having from four to 16 carbon atoms and being free of aliphatic unsaturation, and a has an average value of from 4 to 40; and ii. a thickener selected from the group consisting of beryllium oxide, zinc oxide, aluminum oxide and silicon oxide, the amount of the thickener in the composition being at least sufficient to provide a penetration of 350 when measured according to ASTM Test Method 217D. In preferred embodiments, the compositions will be characterized further in having a thermoconductivity of at least 0.400 BTU/hr./ft.$^2$/°F./ft. when measured in a hot wire test.

In most preferred compositions, $R^1$ will be alkyl of from six to 12 carbon atoms. Special mention is made of compositions wherein, in component (i), $R^1$ is alkyl of from eight to 10 carbon atoms.

The methyl alkyl polysiloxanes used as component (i) can be made by those skilled in the art. For example, they can be prepared by reacting an organohydrogen polysiloxane having the formula

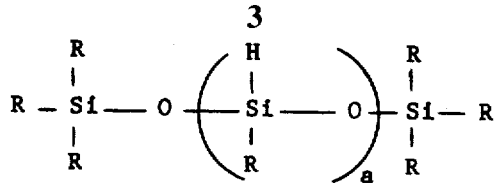

where R and $a$ are as previously defined with an olefinic hydrocarbon of the formula $CH_2\!\!=\!\!CHY$ wherein Y is a straight or branched chain monovalent hydrocarbon radical free of unsaturation and having from two to 14 carbon atoms, in the presence of a conventional SiH-olefin addition catalyst. This process and the products prepared thereby is described in full detail by Brown, Jr., in U.S. Pat No. 3,418,353, assigned to the assignee of the present application, and incorporated herein by reference.

By way of illustration, a liquid trimethyl silyl chain-stopped methyl hydrogen polysiloxane containing an average of from four to 40 methyl hydrogen siloxane units per molecule is reacted with an alpha-olefin of the above formula wherein Y is an alkyl radical, such as ethyl, propyl, isopropyl, hexyl, octyl, decyl, dodecyl, tetradecyl, and the like. Suitable alpha-olefins are, for example, butene-1, pentene-1, 3-methyl butene-1, hexene-1, 3-methyl pentene-1, octene-1, decene-1, dodecene-1, tetradecene-1, hexadecene-1, and the like. Mixtures of such olefines can be used. One molecule of the alpha-olefin will add to each silicon-bonded hydrogen atom, in the general case, in which the two reactants are employed in approximately this stoichiometric ratio. Often, the reaction is facilitated by employing an excess, such as a 10–20% excess, of the olefin for the reaction.

Generally speaking, the reaction is carried out in the presence of a conventional SiH-olefin addition catalyst. These catalysts are generally well known in the art, and useful materials are the elemental platinum catalysts, described in Bailey, U.S. Pat No. 2,970,150, or the chloroplatinic acid catalyst described in Speier et al, U.S. Pat. No. 2,823,218. Further types of catalysts useful in the addition reactions are the "platinum alcoholates" described in Lamoreaux, U.S. Pat. NO. 3,220,972. Still further types of catalysts are the platinum cyclopropane complexes described in Ashby, U.S. Pat. No. 3,159,662, and the platinum ethylene complex described in Ashby, U.S. Pat. No. 3,159,601.

The amount of catalyst employed in effecting reaction between the alpha-olefin and the methyl hydrogen polysiloxane can vary within wide limits, the only requirement being that a sufficient amount of the catalyst is present to effect catalysis with any of the elemental catalysts or the platinum compound catalysts described above. The reaction usually can be carried out by employing an amount of catalyst sufficient to provide from about 1 mole of platinum per 1,000 moles of olefinically unsaturated groups in the alpha-olefin to one mole of catalyst per million moles of alpha-olefin. In addition to employing elemental platinum or platinum compounds as catalysts, the reaction employed to prepare the products of the present invention can also be catalyzed by other Group VIII metals, such as palladium, ruthenium, rhodium and the like.

Typically, the methyl alkyl polysiloxanes are prepared by first charging the methyl hydrogen polysiloxane, which is a liquid, to a reaction vessel. A portion of the alpha-olefin is then added, generally about 10% of the total amount of alpha-olefin to be employed in the entire reaction. The desired amount of the SiH-olefin addition catalyst is then added and the temperature of the reaction mixture is gradually increased until the rate of temperature rise becomes greater than that supplied by the heating element. Subsequently, the reaction temperature is maintained by controlling the rate of addition of the alpha-olefin. Since alpha-olefins which are linear aliphatic compounds containing from four to 16 carbon atoms are either gases or liquid materials, they are added as gases by bubbling or as liquids dropwise into the reaction mixture until the reaction is complete, e.g., as indicated by a drop in the temperature of the reaction mixture. In general, the reaction temperature is from about 50° to 120° C. Where an excess of the alpha-olefin is employed, it is removed from the reaction mixture by distillation. The product is isolated by conventional procedures. The Brown, Jr. patent gives full details.

Component (ii) can be conventional oxide grease thickener of a metal, such as an oxide of beryllium, aluminum, zinc, silicon, magnesium, titanium and the like. These are available from a number of commercial sources. Beryllium oxide is very efficient, but tends to be toxic and care should be used when compounding with this material. Aluminum oxide is excellent and efficient also, but tends to be hard and exhibits some abrasion to equipment used for mixing the compositions. Silicon oxide is inexpensive but its thermoconductivity efficiency is somewhat lower in comparison with the other named materials. The best combination of economy, efficiency, lack of abrasion to processing equipment, and complete freedom from toxicity is shown by zinc oxide, and this is preferred. The oxides used as thickeners will be finely divided and powdery. They can be solids or microspheres — beryllium oxide being an example of the latter. Preferably, the particle size of all such thickeners will be below 10 microns and above 0.1 micron. They are available from a number of commerical sources, being sold as pigments, and as thickeners for mineral oil greases for automotive and marine use, among others.

The amount of the oxide thickener to be used in the present thermoconductive compositions can vary depending on the oxide itself, and on the nature of the methyl alkyl fluid employed. The minimum amount will be that effective to at least provide a penetration value of about 350. The minimum amount, in other words, is that which is necessary to provide the desired consistency. This amount will vary upward from at least 65% by weight based on the thickener and the fluid. The effective upper limit is that above which the material cannot be adequately dispersed by mixing and/or milling the oxide into the fluid. In general, this will approach about 95% by weight based on the combined weight of oxide thickener and methyl alkyl polysiloxane fluid. In preferred embodiments, the amount to be added also depends on the thermoconductivity desired in the final composition. In general, thermoconductivity should be at least greater than about 0.400 BTU/hr./ft.$^2$/°F./ft., and this will be effected with greater than about 75% by weight of the oxide thickener based on the total weight of thickener and methyl alkyl siloxane fluid.

It is relatively easy to prepare the compositions of this invention. Most efficient mixing is achieved by using roller mixtures, such as a three-roll paint mill. However, a simple dough mixer of the type familiarly used to mix viscous greases and doughy plastics can also be used. The methyl alkyl fluid can be put onto the rolls or into the mixer and then the oxide thickener compound can be added slowly during mixing until the desired amount has been loaded. The compositions can be packaged and stored, then used as heat-sinks in accordance with conventional procedures, for example, in semi-conductor devices, in ballasts, as thermal joints between structural members, and the like. The compositions have excellent dielectric properties and, as has been mentioned, can be used in areas where paintability and solderability may be a factor.

DESCRIPTION OF THE PREFERRED EMBODIMENTS

The following examples describe compositions prepared according to this invention. They are illustrative only and are not to be construed to limit the invention in any manner whatsoever.

EXAMPLES 1-5

Five compositions according to this invention are prepared by mixing the named methyl alkyl polysiloxane fluids and zinc oxide on a three-roll paint mill, in the described amounts. Addition of zinc oxide is stopped when the consistency reaches a penetration value of 250 by ASTM method 217D after 60X working. For comparison purposes, a dimethyl polysiloxane and a methyl alkyl polysiloxane, in which the alkyl group had only two carbon atoms, are also prepared with zinc oxide to a penetration value of 250.

The compositions have the formulations summarized in Table 1.

Table 1

Compositions of Methyl Alkyl Polysiloxanes and Zinc Oxide

| Composition | 1 | 2 | 3 | 4 | 5 | A | B |
|---|---|---|---|---|---|---|---|
| (parts by weight) | | | | | | | |
| methyl butyl polysiloxane | 18 | | | | | | |
| methyl hexyl polysiloxane | | 15 | | | | | |
| methyl octyl siloxane | | | 12 | | | | |
| methyl decyl polysiloxane | | | | 14 | | | |
| methyl tetradecyl polysiloxane | | | | | 17 | | |
| dimethyl polysiloxane | | | | | | 23 | |
| methyl ethyl polysiloxane | | | | | | | 20 |
| zinc oxide | 82 | 85 | 88 | 86 | 83 | 77 | 80 |

The above compositions demonstrate that if the chain length of the alkyl group is increased above 4, the amount of oxide that can be loaded into the composition increases until the chain length reaches 8-10 carbons. At this point, increasing the number of carbons in the alkyl group results in a slight decrease in the amount of oxide that can be included in the composition, without departing from the desired penetration of 250. Thus, the compositions within the scope of the invention, Examples 1-5, because they have an increased oxide loading, have improved thermoconductivity in comparison with those having alkyl groups of one and two carbons, respectively, compositions A and B.

EXAMPLE 6

A composition according to this invention is made by mixing and milling on a three-roll paint mill, 88% parts by weight of zinc oxide into 12 parts by weight of a methyl octyl polysiloxane having a viscosity of 500 centistokes at 25° C. This composition has a penetration of about 250. For comparison purposes, a composition is prepared which contains 77 parts by weight of zinc oxide and 23 parts of dimethyl polysiloxane having a viscosity of 350 centistokes at 25° C. This composition also has a penetration of about 250.

The thermoconductivity of each composition is measured by the hot wire test. The composition according to this invention, made with methyl octyl polysiloxane, has a vastly improved thermoconductivity, the value being 0.760 BTU/hr./ft$^2$/°F./ft. In contrast, the compositon prepared from the dimethylpolysiloxane composition a thermoconductivity of only 0.352 BTU/hr./ft.$^2$/°F./ft.

EXAMPLES 7-10

Four compositions are prepared in which the amount of oxide is varied, using methyl octyl polysiloxane as the fluid. The thermoconductivity of these compositions is measured by the hot wire test. The results are set forth in Table II.

TABLE II

Thermoconductivity of Compositions Comprising Methyl Octyl Polysiloxane Thickened with Zinc Oxide

| Composition | 7 | 8 | 9 | 10 |
|---|---|---|---|---|
| (parts by weight) | | | | |
| methyl octyl polysiloxane | 23 | 20 | 15 | 12 |
| zinc oxide | 77 | 80 | 85 | 88 |
| Properties | | | | |
| Penetration, worked 60X | 350 | 300 | 280 | 250 |
| Thermoconductivity BTU/hr./ft.$^2$/°F./ft. | 0.403 | 0.517 | 0.640 | 0.760 |

The above examples demonstrate that compositions having improved thermoconductivity can be obtained based on the use of methyl alkyl silicone, preferably in the $C_4$ to $C_{16}$ range and, more particularly, in the $C_6$ to $C_{12}$ range, when thickened with oxides of zinc. Obviously, many variations can be made in the compositions of the described working examples without departing from the spirit and scope of the invention. By way of illustration, for the zinc oxide, there can be substituted beryllium oxide, e.g., microspheres, aluminum oxide, 1-10 microns, and silicon oxide (fine silica, 1-10 microns), as well as mixtures of any of the foregoing.

The invention and all of its obvious equivalents are intended to be defined by the appended claims.

I claim:

1. A composition having high thermoconductance comprising:

i. a methyl alkyl polysiloxane having the formula

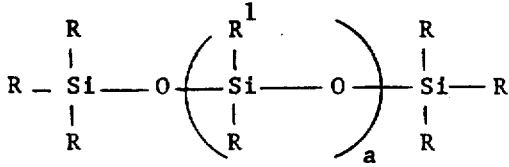

wherein R is methyl and $R^1$ is a monovalent hydrocarbon radical having from four to 16 carbon atoms and being free of aliphatic unsaturation, and a has an average value of from 4 to 40; and ii. a thickener selected from the group consisting of beryllium oxide, zinc oxide, aluminum oxide and silicon oxide, the amount of said thickener in said composition being at least sufficient to provide a penetration of 350 when measured according to ASTM Test Method 217D.

2. A composition as defined in claim 1, further characterized by having a thermoconductivity of at least 0.400 BTU/hr./ft.$^2$/°F./ft.

3. A composition as defined in claim 1 wherein, in component (i), $R^1$ is alkyl of from six to 12 carbon atoms.

4. A composition as defined in claim 3 wherein, in component (i), $R^1$ is alkyl from eight to 10 carbon atoms.

5. A composition as defined in claim 1 wherein component (ii) is zinc oxide.

6. A composition having high thermoconductance comprising:
   i. a trimethylsilyloxy chain-stopped methyl alkyl polysiloxane fluid wherein said alkyl groups have an average chain length of from eight to 10 carbon atoms, said fluid having a viscosity in the range of 25 to 1,500 centistokes at about 25° C.; and
   ii. a thickener comprising zinc oxide, the zinc oxide being present in an amount of from about 65 to about 95% by weight of (i) and (ii), the composition having a penetration of at least 350 when measured according to ASTM Test Method 217D.

7. A composition as defined in claim 6, further characterized in having a thermoconductivity of greater than about 0.400 BTU/hr./ft.$^2$/°F./ft.

8. A composition as defined in claim 6 wherein component (1) is a trimethylsilyloxy chain-stopped methyl octyl polysiloxane fluid having an average of about 24 repeating units, the zinc oxide is present in an amount corresponding to 80 to 85% the weight of (i) and (ii), the composition has a penetration of from about 240 to about 280 when measured according to ASTM Test Method 217D and the thermoconductivity is from about 0.500 to about 0.600 BTU/hr./ft.$^2$/°F./ft.

9. A composition having high thermoconductance comprising:
   i. a methyl alkyl polysiloxane having the formula

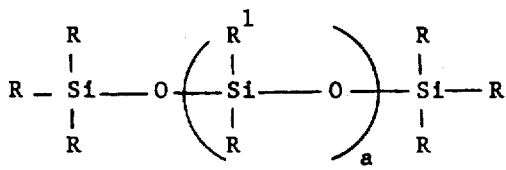

wherein R is methyl and $R^1$ is a monovalent hydrocarbon radical having from four to 16 carbon atoms and being free of aliphatic unsaturation, and *a* has an average value of from 4 to 40; and ii. a thickener selected from the group consisting of beryllium oxide, zinc oxide, aluminum oxide and silicon oxide, the amount of said thickener in said composition being from at least an amount sufficient to provide a penetration of 350 when measured according to ASTM Test Method 217D to about 95% by weight of (i) and (ii).

10. A composition as defined in claim 9, further characterized by having a thermoconductivity of at least 0.400 BTU/hr./ft.$^2$/°F./ft.

11. A composition as defined in claim 9 wherein, in component (i), $R^1$ is alkyl of from six to 12 carbon atoms.

12. A composition as defined in claim 11 wherein, in component (i), $R^1$ is alkyl from eight to 10 carbon atoms.

13. A composition as defined in claim 9 wherein component (ii) is zinc oxide.

* * * * *